United States Patent [19]
Ericson et al.

[11] Patent Number: 5,564,679
[45] Date of Patent: Oct. 15, 1996

[54] CHEMICALLY-RESISTANT FLUID CONTROL VALVES

[75] Inventors: Richard D. Ericson, North Andover; Steven M. King, Littleton, both of Mass.

[73] Assignee: MKS Instruments, Inc., Andover, Mass.

[21] Appl. No.: 275,971

[22] Filed: Jul. 15, 1994

[51] Int. Cl.$^6$ ............................................... A16K 1/22
[52] U.S. Cl. ............................................. 251/308; 137/375
[58] Field of Search .................................. 251/305, 306, 251/308; 137/375

[56] References Cited

U.S. PATENT DOCUMENTS

| | | | |
|---|---|---|---|
| 3,425,439 | 2/1969 | Duffey et al. ............................ | 137/375 |
| 4,604,254 | 8/1986 | Yamamoto et al. ................. | 137/375 X |
| 4,674,528 | 6/1987 | Nishio et al. ............................ | 137/375 |
| 4,828,221 | 5/1989 | Scobie et al. ............................ | 251/308 |

FOREIGN PATENT DOCUMENTS

| | | | |
|---|---|---|---|
| 175393 | 9/1886 | France ................................... | 251/308 |
| 2470904 | 6/1981 | France ................................... | 251/308 |

*Primary Examiner*—John C. Fox
*Attorney, Agent, or Firm*—Lappin & Kusmer

[57] ABSTRACT

A chemically-resistant fluid control valve is disclosed generally comprising fluid inlet and outlet passages separated by fluid control means, which control means comprise a flapper plate disposed in the fluid passageway and mounted on a rotatable shaft that passes laterally through the fluid passageway by means of releasable fasteners adapted to engage correspondingly-shaped fastener elements of the flapper plate, which elements are also adapted to receive the shaft in a channel between the fastener elements, wherein at least all wetted surfaces of each of the several components consist essentially of a chemically-resistant material.

17 Claims, 3 Drawing Sheets

CHEMICALLY-RESISTANT FLUID CONTROL VALVES

The present invention relates generally to chemically-resistant fluid control valve apparatus wherein all wetted valve surfaces comprise a chemically-resistant material, preferably Teflon or similar material, while retaining a high degree of mechanical strength and ease of assembly and disassembly for cleaning and maintenance.

BACKGROUND OF THE INVENTION

Fluid flow control or throttle valves are well-known in the art as a means for regulating rates of fluid flow. One type of fluid flow control device is a so-called flapper valve in which a thin "flapper" or plate-like member is disposed inside a fluid passageway and centrally mounted on a rotatable shaft passing laterally through the interior of the passageway. The plane of the flapper can thus be oriented by rotating the shaft in a clockwise or counterclockwise direction. The flapper is precisely dimensioned so as to close and more or less seal the passageway to stop or at least substantially reduce fluid flow when the plane of the flapper is oriented substantially perpendicular to the longitudinal axis of the passageway. Alternatively, rotating the shaft and the flapper 90° or so such that the plane of the flapper is substantially parallel to the longitudinal axis of the passageway results in opening the passageway so as to permit fluid flow. The simplicity and ease of operation of such flapper valves makes them particularly well suited to regulating fluid flow.

For many fluid control applications, such flapper valves can be fabricated using components made of conventional metallic materials such as steel, stainless steel, and so forth. Metallic construction results in valves having a high degree of durability, mechanical strength and good resilience. Where the fluid being regulated, however, is highly corrosive and chemically reactive with conventional metals, for example chlorine and hydrogen fluoride, alternative construction materials must be utilized for control valve fabrication to prevent deterioration of the valve and contamination of the fluid. But, various known corrosion-proof, high-strength alloys and composites are typically extremely expensive, difficult to fabricate, or both. Silicon carbide, for example, is both cost-prohibitive and almost impossible to machine because it is so brittle.

Various relatively inexpensive plastic materials, such as Teflon and related compounds, are known to be highly impervious to corrosive substances such as chlorine and hydrogen fluoride. One solution to this problem would thus be to construct flapper valves in which all components exposed to the regulated corrosive fluid were formed of Teflon or similar corrosion-resistant plastic material. For example, an all-Teflon flapper element could be mounted on an all-Teflon shaft using all-Teflon screws that pass through apertures spaced along the shaft and are received into threaded openings at corresponding locations along one face of the flapper element.

While such a construction would have the desired property of being substantially impervious to corrosive fluids, such a valve would not have a high degree of mechanical strength or a long service life. Because Teflon and similar plastic materials generally have low resilience and relatively low mechanical strength, repeated opening and closing of such an all-Teflon valve would likely lead to early breakage and valve failure. For example, the relatively thin all-Teflon shaft, weakened by the presence of screw openings along its length, would be readily subject to fracture or distortion. Also, the screw elements would have a tendency to work loose from the flapper thereby preventing precision valve operation. An alternative to using screws to secure the flapper to the shaft would be to permanently bond these two elements, for example using an adhesive or ultrasonic welding. But such an alternative construction would make it impossible to disassemble the valve for periodic service and cleaning.

These and other problems and limitations are overcome with the chemically-resistant fluid control valves of this invention.

OBJECTS OF THE INVENTION

Accordingly, it is a general object of this invention to provide a fluid flow control apparatus in which all wetted valve surfaces are made of a chemically-resistant material.

A principal object of this invention is to provide a fluid control valve that is highly resistant to chemical corrosion but is also strong and durable.

It is also an object of this invention to provide a corrosion-resistant fluid valve which is easy to disassemble for maintenance.

A further object of this invention is to provide a strong, durable, easily serviceable valve assembly adapted to control the flow of highly corrosive fluids such as chlorine and hydrogen fluoride.

A specific object of this invention is to provide a corrosion-resistant flapper valve in which removable clip elements are adapted to releasably engage a correspondingly-shaped element of the flapper plate so as to releasably mount the flapper plate to a rotatable shaft without the need for screws or adhesive fastening means.

These and other objects and advantages of this invention will be better understood from the following description, which is to be read together with the accompanying drawings.

SUMMARY OF THE INVENTION

The chemically-resistant fluid control valve of this invention generally comprises a flapper plate disposed in a fluid passageway and centrally mounted on a rotatable shaft that passes laterally through the fluid passageway such that rotation of the shaft results in rotating the plane of the flapper plate through an arc of at least about 90° so as to either open or close the passageway to fluid flow. In a preferred embodiment, a face portion of the flapper plate includes pairs of projections which define an open channel or groove shaped and sized so as to receive the rotatable shaft. The projections are further shaped so as to mate with and be engaged by one or more fastener members which fit over the open portion of the channel when the shaft is disposed inside thereby locking the shaft in place and securing it to the flapper plate. All wetted surfaces of the fluid passageway, the flapper plate, the rotatable shaft, and the fastener members consist essentially of a chemically-resistant material.

DETAILED DESCRIPTION OF THE INVENTION

Figure 1:
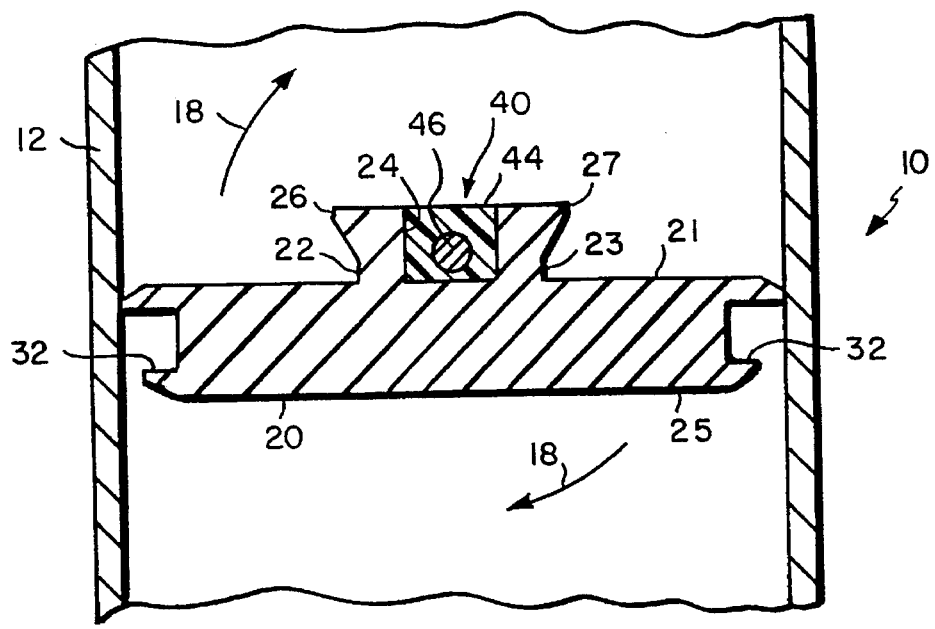
FIG. 1 is a schematic cross-sectional view of a portion of a valve apparatus according to a preferred embodiment of the present invention wherein the flapper plate is disposed in the closed position to prevent fluid flow.
Figure 2:
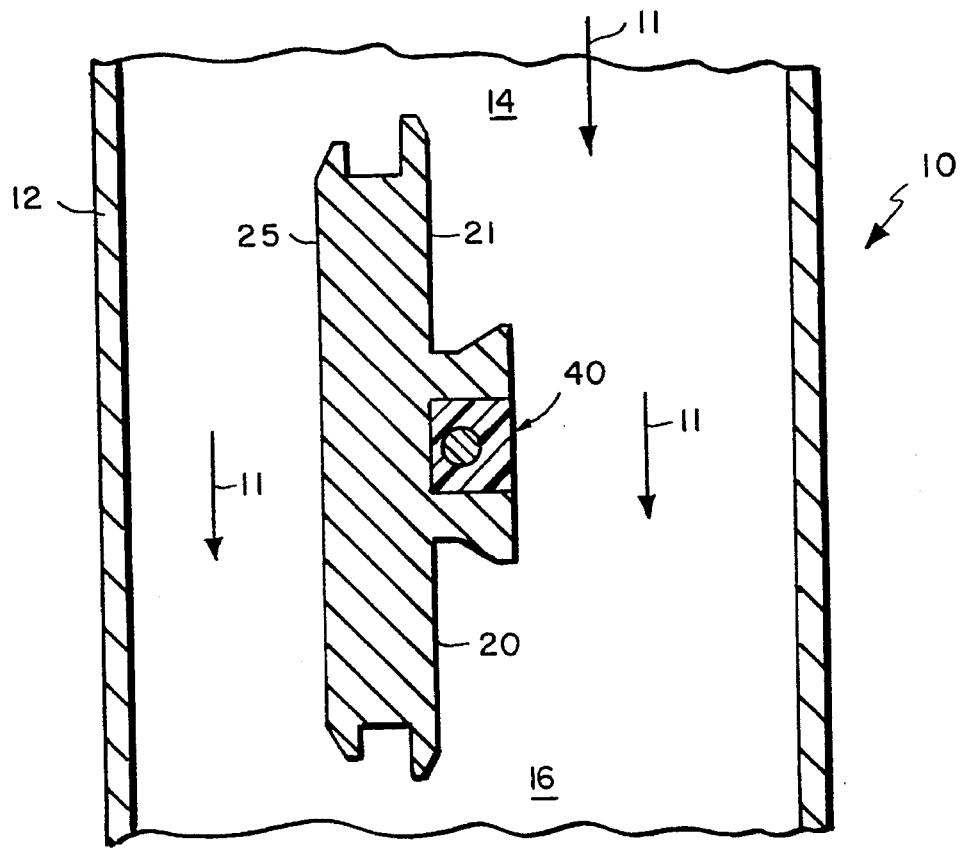
FIG. 2 is a schematic cross-sectional view similar to FIG. 1 but wherein the plane of the flapper plate has been rotated 90° to the open position to permit fluid flow.

The chemically-resistant fluid flow control valve, generally indicated by the numeral 10 in FIGS. 1 and 2, comprises a generally tubular conduit with sidewalls 12 defining a fluid passageway, and a flapper assembly disposed inside that passageway. When the valve is in the "open" position as shown in FIG. 2, fluid may flow in the direction generally indicated by the arrows 11 from a fluid inlet passage 14, past the flapper assembly, as hereinafter described, and out through a fluid outlet passage 16. As seen in FIG. 1, when the valve is in the "closed" position, fluid flow is substantially blocked by the flapper assembly. Valve 10 is opened by rotating the flapper assembly approximately 90° in a clockwise direction, as generally indicated by arrows 18 in FIG. 1, and is closed by rotating the flapper assembly back in a counterclockwise direction.

The flapper assembly of the valve of this invention generally comprises a relatively thin flapper or plate-like element 20 shaped and sized so as to fit relatively snugly within sidewalls 12 to substantially stop fluid flow when the plane of the flapper is substantially perpendicular to the longitudinal axis of the tubular conduit, as seen in FIG. 1. The flapper assembly further comprises a rotatable, elongated support member, such as shaft 40, and fastening means (not shown in FIGS. 1 and 2) for releasably securing flapper 20 to support member 40. For clarity of illustration, the fastening means have not been shown in FIGS. 1 and 2, but it will be understood that such means are required for a complete, operable assembly.

Figure 3:
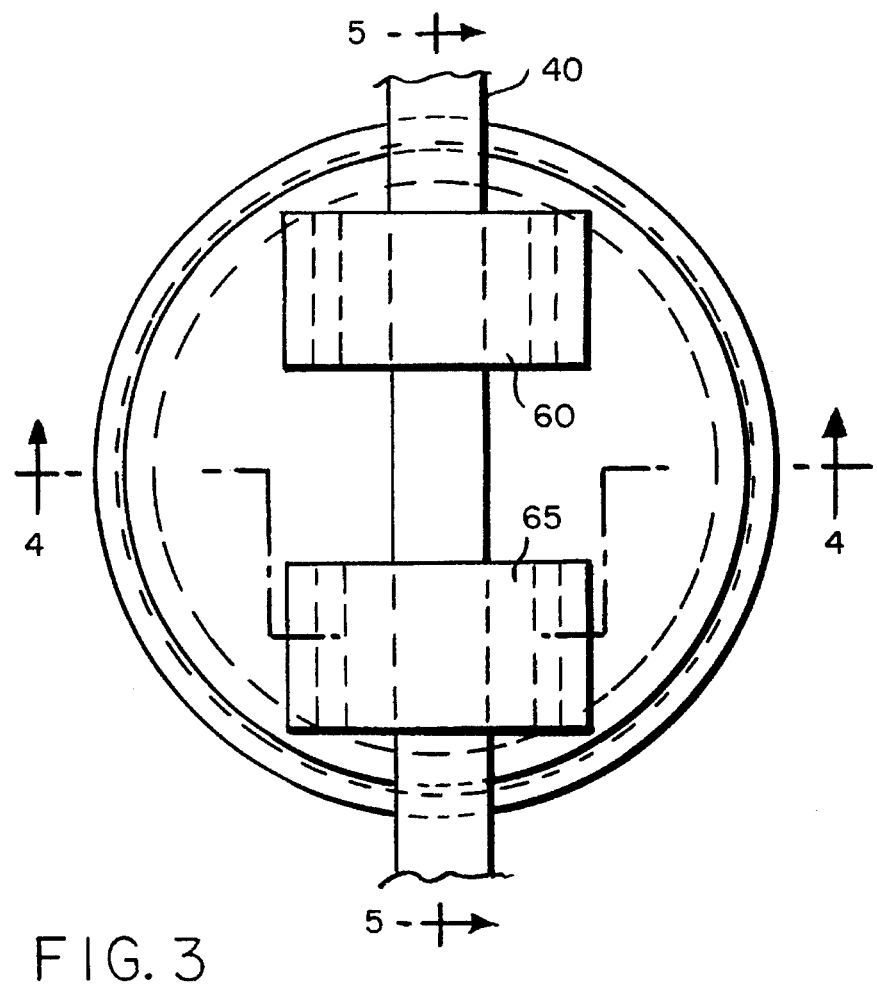
FIG. 3 is a top elevational view of a flapper assembly according to a preferred embodiment of the present invention with two clip elements locked in place to mating portions of the top face of the flapper plate in order to releasably fasten the flapper plate to the rotatable shaft.

The top or upper face 21 of flapper 20 (as seen in FIG. 1) comprises one or more opposite facing pairs of generally male-shaped projections 22, 23 arranged so as to define an open channel or conduit 24 therebetween for receiving support member 40. The outermost facing surface of each projection 22, 23 (i.e. the surface at least partly facing sidewalls 12) is at least partly outwardly flared or angled so as to form an outwardly projecting lip or shoulder 26, 27 respectively with respect to the upper face of flapper 20. Although only a single pair of projections 22, 23 are seen on the surface of flapper 20 in the cross-sectional views of FIGS. 1 and 2, it will be understood that two or more pairs of such projections, aligned so as to define a straight channel, could also be used. FIG. 3 for example illustrates the use of two aligned pairs of such projections. In a preferred embodiment, as shown in FIGS. 1 and 2, the innermost facing surface of each projection 22, 23 (i.e. the surface that forms a sidewall for channel 24) is substantially perpendicular to the upper face 21 of flapper 20 thereby creating a channel 24 having a generally rectangular cross section. In this embodiment, if the height of projections 22, 23 is identical to the distance between them, channel 24 will have a square cross section.

In a preferred embodiment, flapper 20, including projections 22, 23 are formed from a single piece of chemically-resistant material. For example, a starting block of Teflon or comparable corrosion-resistant plastic can be machined to form an element like flapper 20, or other desired shapes. Alternatively, flapper 20 can be fashioned from a metallic or other material and then thoroughly coated along all exterior surfaces with a chemically-resistant material such as Teflon such that all wetted surfaces of the flapper consist essentially of the chemically-resistant material.

As seen in FIGS. 1 and 2, flapper 20 comprises a generally circular upper face 21 having projections 22, 23 as described above, and a generally circular lower face 25. Upper face 21 has a diameter substantially equal to the internal diameter of the fluid passageway defined by sidewalls 12, whereas lower face 25 has a diameter slightly smaller than that of face 21. In a preferred embodiment as seen in FIGS. 1 and 2, the outermost edge of face 21 may be beveled to insure a tighter fit inside sidewalls 12, thereby providing a better seal to prevent fluid flow, when the valve is in the closed position as in FIG. 1. As seen in FIGS. 1 and 2, flapper 20 also may comprise an annular groove or channel 32 along its outer sidewall disposed between upper face 21 and lower face 25. The benefit of this design is in the added structural stability and durability that results from using a relatively thicker flapper element, while preserving added flexibility around the generally thinner perimeter of face 21 in order to provide better sealing with the inside of sidewalls 12. Sealing effects may be further enhanced by disposing an appropriately-sized O-ring in annual groove 32, the O-ring being formed from a different chemically-resistant material than flapper 20, particularly one having lesser structural strength but greater elasticity, for example the materials Chemraz (a trademark of Greene-Tweed & Co., Inc. of Culpsville, Pa.), Kalrez (a trademark of Du Pont Corporation of Wilmington, Del.), and the compound polytetrafluoroethylene (PTFE).

Rotatable support member 40 is adapted to fit removably but securely within channel 24 such that rotation of member 40 will cause flapper 20 to also rotate in order to open or close valve 10. For example, where channel 24 has a substantially rectangular or square cross section, at least that portion of member 40 that is disposed in channel 24 will generally have a cross section of corresponding size and shape. It will be understood that, for purposes of illustration in FIGS. 1, 2 and 4, the open spaces between the outer walls of member 40 and the walls of channel 24 have been exaggerated. In practice, these elements would be machined to close tolerances so as to obtain a generally tight fit in order to maintain good responsiveness of flapper 20 to any rotation of member 40.

The remainder of member 40, other than those portions disposed in channel 24, may be of any desired cross section, either the same or different from that of the channel 24 engagement portions. To facilitate rotation of member 40, however, at least those portions of member 40 that engage or pass through sidewalls 12 should have a generally circular cross section. For example, in a preferred embodiment, as better illustrated in FIG. 5, member 40 comprises a shaft of generally circular cross section; however, the channel-engagement section of member 40, generally indicated at 50 in FIG. 5, has been machined to a generally square cross section.

At least one rotation engagement end of member 40 passes through an aperture in sidewall 12 to be engaged by external rotation means. The aperture in sidewall 12 includes sealing means to prevent any fluid loss when valve 10 is in use. The rotation means (not shown) is adapted to rotate member 40 through an arc of at least 90° in order to open or close valve 10. The rotation means may be manual, hydraulic or electronic, and may be activated manually or automatically, for example upon receipt of electronic signals from remote sensors. Such technology is conventional in the art and is not regarded per se as a novel feature of this invention. The end of member 40 opposite the rotation engagement end is rotatably supported, for example in an indented portion of sidewall 12 opposite from the rotation end sidewall aperture or, alternatively, the opposite end of member 40 passes through a second sidewall aperture opposite the rotation engagement end aperture and is rotatably supported externally of the valve interior.

In one embodiment of this invention, support member 40 is formed from a single piece of a chemically-resistant material, such as Teflon. But an all-plastic support member is relatively weak. Alternatively, for added strength and durability, member 40 may comprise a rod or shaft of a metallic or other material that has been thoroughly coated along at least all wetted surfaces located inside the completed valve with a chemically-resistant material.

Figure 4:
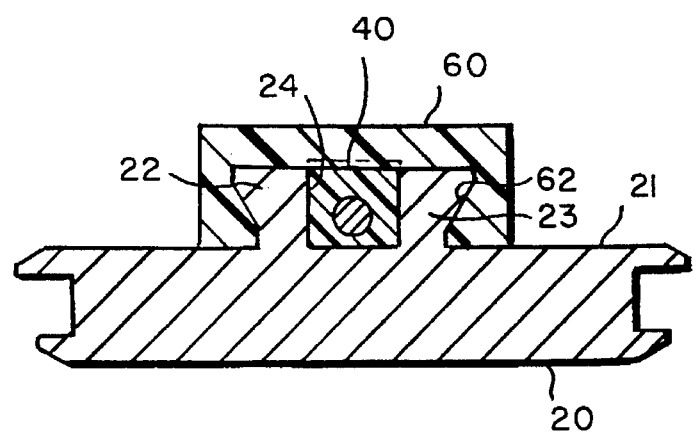
FIG. 4 is a side elevational view in cross section of the flapper assembly of FIG. 3 taken along the line 4—4.
Figure 5:
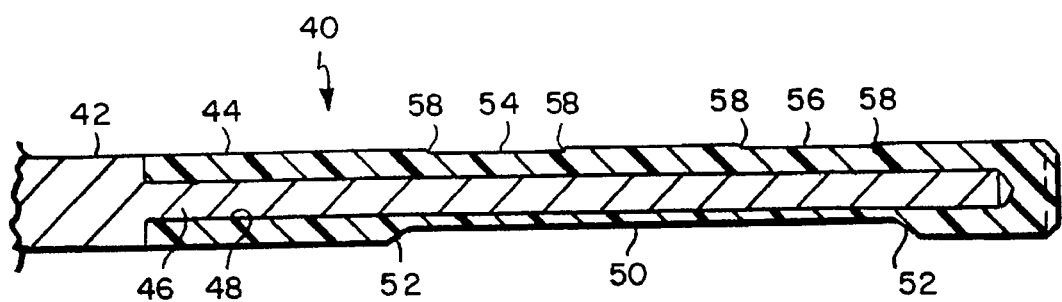
FIG. 5 is an enlarged side elevational view in cross section of just the rotatable shaft of FIG. 3 taken along the line 5—5.

In a preferred variation of this alternative construction as shown in FIGS. 1, 2, 4 and 5, member 40 comprises a two-piece unit having a metallic core, such as stainless steel, and a chemically-resistant shell or sleeve completely surrounding at least that portion of the metallic core located inside the assembled valve. The advantages of this two-piece construction are: first, the portion of support member 40 located inside the valve has significantly enhanced strength compared, for example, with an all-plastic support member; second, externally of the valve interior, all of the load rests on, and all of the rotation torque is applied to, the metallic core. One preferred mode for fabricating such a two-piece support member, as illustrated in FIG. 5, is to begin with a metallic rod 42, for example of stainless steel, of appropriate diameter based on the width of channel 24. One end of metallic rod 42, over a length at least as great as the diameter of the fluid passageway, is machined to a uniform reduced diameter, the reduced-diameter portion 46 being left with a rough, knurled surface. One end of a solid tubular element 44 of a chemically-resistant material, for example Teflon, having an overall length longer than that of the reduced-diameter portion of the metallic rod, is drilled to create a centrally-located closed-end bore 48 sized to receive the reduced-diameter portion 46 of the metallic rod. The outer diameter of the tubular element 44 is substantially identical to that of the unreduced-diameter end of the metallic rod 42 so as to create a two-piece support member 40 having a substantially uniform diameter along its length when the reduced-diameter shaft portion 46 of the metallic rod is mated to the bore 48 of the chemically-resistant tubular element. If the bore 48 is drilled so as to just accommodate the reduced-diameter shaft, after being initially squeezed together these two elements will be held securely by the knurled exterior surface of the shaft, thereby creating a chemically-resistant shell or sleeve around shaft portion 46. For some applications, adhesive means may also be used to secure shaft portion 46 inside bore 48.

As also seen in FIG. 5, after the two-piece support member is assembled, a central, channel-engagement portion 50 of chemically-resistant sleeve 44 is precision machined in order to conform to the geometry of channel 24. Thus, if channel 24 has a substantially square cross section, channel-engagement portion 50 is preferably machined to a corresponding size and shape. On three of the four sides of channel-engagement portion 50, beveled edges 52 may be used to define the transition from the rounded, tubular portion of sleeve 44 to the machined, squared-off portion 50. The fourth, upper-facing side of portion 50, however, in a preferred embodiment, is machined to include one or more shallow, rectangular locking slots or grooves 54, 56 designed to receive the clip fasteners and "lock" them into place as described hereinafter.

As previously noted, in a completed valve assembly, releasable fastening means must be used to maintain support member 40 in channel 24 as seen in FIGS. 1 and 2. The preferred releasable fastener 60 for this invention is a dovetail clip comprising a generally block-like C-shaped member defining a female-shaped cavity 62 with at least one open side, sized and shaped so as to engage a pair of opposite facing male-shaped projections 22, 23 in the manner illustrated in FIG. 4. FIG. 4 will be recognized as a somewhat enlarged cross-sectional view of the flapper assembly of FIGS. 1 and 2, but this time with fastener means 60 in place thereby mounting the flapper 20 on support member 40.

The preferred configuration and placement of fastener means 60 is better understood by reference to FIG. 3, a top elevational view of the flapper assembly. In FIG. 3, two clip fasteners 60 and 65 are used to engage two aligned pairs of projections (seen in dotted outline) in order to hold shaft 40 in the channel 24 between the pairs of projections. Once shaft 40 is disposed in the channel 24, as seen in FIG. 4, clip fasteners 60 and 65 are positioned on top face 21 of flapper 20 adjacent their respective pairs of projections and slid laterally over the projections thereby engaging the pairs of projections. When each fastener is slid directly over its respective locking slot or groove 54, 56 along shaft 40 (as seen in FIG. 5), it "locks" into place and is restrained against further lateral movement by the small ridges 58 on either side of the slots 54, 56. When it is desired to disassemble the valve and flapper assembly for cleaning, maintenance, or repair, a small amount of upward and sideward manual pressure on the clip fasteners is sufficient to dislodge them from slots 54, 56 thereby permitting them to be slid out of engagement with their respective pairs of projections.

Each of clip fasteners 60, 65 of this invention may be formed from a single piece of a chemically-resistant material, such as Teflon. Alternatively, the clip fasteners may be formed from a metallic or other material and then thoroughly coated with a chemically-resistant material such that all wetted surfaces of the fasteners consist essentially of the chemically-resistant material.

Figure 6:
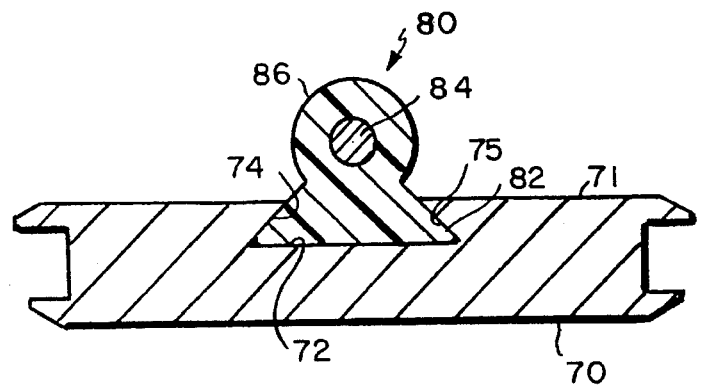
FIG. 6 is a schematic cross-sectional view of a portion of a valve apparatus according to an alternative embodiment of the present invention.
Figure 7:
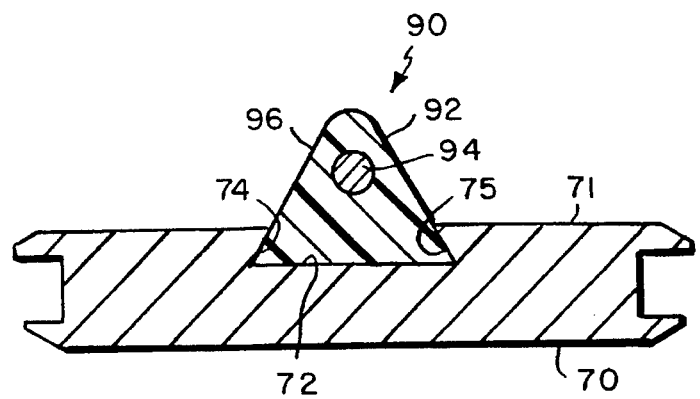
FIG. 7 is a schematic cross-sectional view of a portion of a valve apparatus according to another alternative embodiment of the present invention.

Alternative embodiments of the present invention are illustrated in FIGS. 6 and 7. Flapper 70 in FIGS. 6 and 7 is substantially similar to flapper 20 in FIGS. 1 and 2 except that flapper 70 comprises a dovetail or trapezoidal-shaped groove 72 centrally located along upper surface 71 of flapper 70, in place of projections 22, 23 of flapper 20. The trapezoidal-shaped groove 72 is intended to function as the female portion of a dovetail joint in conjunction with a corresponding male portion of the shaft or support member. The dovetail groove 72 thus comprises two inwardly-projecting sidewalls 74, 75 terminating at surface 71 so as to define an open channel running the diameter of flapper 70 and having a larger width at the bottom than at the open top. Projecting sidewalls 74, 75 thus function as fastener elements which can be releasably engaged by correspondingly-shaped fastener portions of the support member, as hereinafter described.

Various shaft or support member configurations can be adapted to provide fastener portions to releasably engage sidewalls 74, 75. In FIG. 6, for example, a generally rounded support member 80 comprises a dovetail-shaped projection 82 along one side thereof, the projection being sized and shaped so as to slidably engage sidewalls 74, 75. It will be understood that, for purposes of illustration in FIG. 6, the open spaces between the outer walls of the dovetail projection 82 of member 80 and the walls of groove 72 have been exaggerated. In practice, these elements would be machined to close tolerances so as to obtain a generally tight fit in order to maintain good responsiveness of flapper 70 to any rotation of member 80.

FIG. 7 illustrates a somewhat different support member configuration in which a channel-engagement portion 92 of support member 90 has a generally triangular cross section. Two corners and the respective connecting face of the triangle function as the mating portion of the support member, the triangular portion 92 being sized and shaped so as to slidably engage sidewalls 74, 75. Again, it will be understood that, for purposes of illustration in FIG. 7, the open spaces between the outer walls of triangular portion 92 and the walls of groove 72 have been exaggerated. Alternative but equivalent structures for releasably engaging a channel portion of a flapper to a portion of an elongated support member will be apparent to those skilled in the art; and, such equivalent structures are also considered to be within the scope of this invention.

It will be apparent to those skilled in the art that in the flapper assemblies of FIGS. 6 and 7 the flapper element and the support member are releasably engaged without the need for screws or the like, and without adhesive or permanent bonding means. On the other hand, disassembly and servicing of the flapper assemblies of FIGS. 6 and 7 is somewhat more cumbersome than that of FIGS. 1–4 because of the need to completely remove the shaft member from the flapper and the fluid conduit before the flapper can be withdrawn from the conduit. Accordingly, for most applications, the embodiment of FIGS. 1–4 utilizing releasable clips is believed to be preferred.

Similar to the description above with respect to support member 40 of FIGS. 1–5, support members 80 and 90 of FIGS. 6 and 7 respectively may be formed from a single piece of a chemically-resistant material, such as Teflon. Alternatively, as illustrated in FIGS. 6 and 7, support members 80 and 90 may comprise a metallic core, 84 and 94 respectively, surrounded by a chemically-resistant sleeve, 86 and 96 respectively. Similar fabrication techniques as described above with respect to constructing a two-piece support member 40 may also be used to construct a two-piece member 80 or 90.

The chemically-resistant materials used in connection with this invention include all of those substances that are resistant to corrosive fluids, such as chlorine and hydrogen fluoride, and can either be formed into self-supporting component parts or else used to coat and seal component parts fashioned from metals, alloys and the like. Especially preferred for use in connection with this invention are the family of well-known corrosion-resistant plastic materials manufactured by the Du Pont Corporation of Wilmington, Del. under such tradenames as Teflon and Tefzel. Because these known chemically-resistant materials have different properties (for example, Tefzel is recognized to have substantially greater tensile strength than the various Teflon compounds), it is within the scope of this invention to utilize different chemically-resistant materials for different components of a single fluid control valve assembly.

The chemically-resistant, corrosion-proof valves of this invention may be adapted for use with both gaseous and liquid fluid flow. The valves of this invention may be made smaller or larger to accommodate different fluid flow rates.

Since other change and modifications may be made in the above-described apparatuses and processes without departing from the scope of the invention herein involved, it is intended that all matter contained in the above description shall be interpreted in an illustrative and not in a limiting sense.

Having described the invention, what is claimed is:

1. A butterfly valve for fluid control in a conduit for handling corrosive fluids, said valve comprising: wall means defining a body having spaced end faces and including a bore between said end faces for passage of fluid through said body, at least the inner surface of said wall means comprising a fluorocarbon plastic; an elongated support member wherein at least the outer surface comprises fluorocarbon plastic, said support member being rotatably mounted in said wall means and completely passing laterally through said bore so as to permit at least limited rotation about its longitudinal axis; a rotatable disc member received in said bore and mounted on said elongated support member by means of at least a U-shaped channel formed along a portion of one face of said disc, said channel comprising two outwardly flanged channel side members spaced to snugly receive said support member therebetween, said disc and channel comprising a single-piece unit wherein at least the outer surface comprises fluorocarbon plastic, further wherein said disc member is sized to form a substantially fluid tight seal when in a closed position relative to said wall means for preventing fluid flow through said bore; and, a fastening clip, at least the outer surface of which comprises fluorocarbon plastic, locking said support member into said channel solely by engaging the respective flanged portions of said channel side members.

2. A butterfly valve according to claim 1 further wherein said support member has a substantially rectangular cross section along at least a channel-receiving portion adapted to be received in said channel.

3. A butterfly valve according to claim 2 further comprising a slot along one flat side of each channel-receiving portion of said support member, said slot having a width sufficient to receive said fastening clip therein.

4. A butterfly valve according to claim 1 wherein said fluorocarbon plastic is selected from the group consisting of Teflon and Tefzel.

5. A butterfly valve according to claim 1 wherein said support member comprises a metal core at least a portion of which is surrounded by a fluorocarbon plastic sleeve.

6. A butterfly valve according to claim 5 further wherein said metal core comprises a reduced-diameter midsection to receive said sleeve, and said sleeve has an axial bore of substantially the same diameter as said reduced-diameter midsection.

7. A butterfly valve according to claim 6 further wherein said reduced-diameter midsection comprises a knurled surface.

8. A butterfly valve according to claim 1 further wherein said disc member comprises two of said U-shaped channels in axial alignment along the same face of said disc member and a fastening clip is in engagement respectively with the flanged portions of each pair of channel side members.

9. In a fluid control valve apparatus comprising a disc member mounted on a rotatable support shaft that completely passes through the valve interior, the disc member and shaft being disposed inside a fluid conduit and adapted to be opened or closed to fluid flow by rotation of said support shaft, the improvements comprising: said fluid conduit being completely lined with a fluorocarbon plastic; the surface of said shaft disposed inside said conduit being completely covered with a fluorocarbon plastic; said disc member comprising at least a U-shaped channel along one face of said disc, said channel comprising two outwardly flanged channel side members spaced to snugly receive said support member therebetween, said disc and channel comprising a single-piece unit wherein at least the outer surface comprises fluorocarbon plastic; and, a fastening member, at least the outer surface of which comprises fluorocarbon plastic, locking said support member into said channel solely by engaging the respective flanged portions of said channel side members.

10. A fluid control valve according to claim 9 further wherein said support member has a substantially rectangular cross section along at least a channel-receiving portion adapted to be received in said channel.

11. A fluid control valve according to claim 10 further comprising a slot along one flat side of each channel-receiving portion of said support member, said slot having a width sufficient to receive said fastening clip therein.

12. A fluid control valve according to claim 9 wherein said fluorocarbon plastic is selected from the group consisting of Teflon and Tefzel.

13. A fluid control valve according to claim 9 wherein said support member comprises a metal core surrounded by a fluorocarbon plastic sleeve.

14. A fluid control valve according to claim 13 further wherein said metal core comprises a reduced-diameter midsection to receive said sleeve, and said sleeve has an axial bore of substantially the same diameter as said reduced-diameter midsection.

15. A fluid control valve according to claim 14 further wherein said reduced-diameter midsection comprises a knurled surface.

16. A fluid control valve according to claim 9 further wherein said disc member comprises two of said U-shaped channels in axial alignment along the same face of said disc member and a fastening clip is in engagement respectively with the flanged portions of each pair of channel side members.

17. In a fluid control valve apparatus comprising a disc member mounted on a rotatable support shaft that completely passes through the valve interior, the disc member and shaft being disposed inside a fluid conduit and adapted to be opened or closed to fluid flow by rotation of said support shaft, the improvements comprising: said fluid conduit being completely lined with a fluorocarbon plastic; the surface of said shaft disposed inside said conduit being completely covered with a fluorocarbon plastic; said disc member comprising two spaced U-shaped channels along a face of said disc, each said channel comprising two channel side members, each with an outwardly-flanged lip, spaced to snugly receive said support member therebetween, said disc and channels comprising a single-piece unit made of fluorocarbon plastic; and, two fluorocarbon plastic fastening clips locking said support shaft into said channel solely by engaging the respective lips of said channel side members.

* * * * *